(No Model.)
S. A. POTTER.
BICYCLE.
No. 287,717. Patented Oct. 30, 1883.
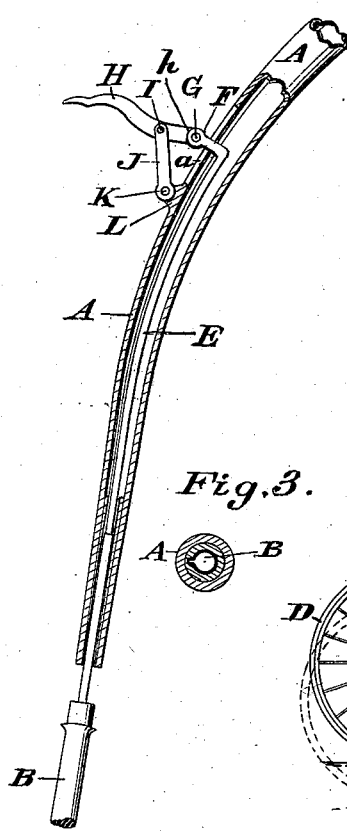
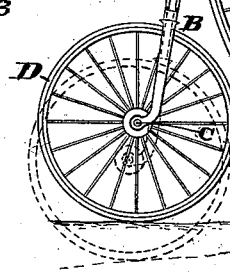
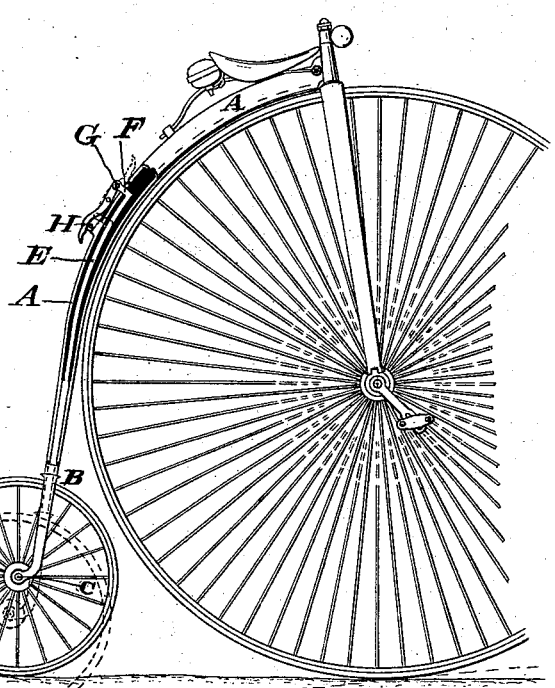
Attest:
Geo. L. Wheelock
H. S. Knight
Inventor:
Samuel A. Potter
By Knight Bros.
Attys.

United States Patent Office.

SAMUEL A. POTTER, OF CINCINNATI, OHIO, ASSIGNOR OF ONE-HALF TO HIRAM M. HOWARD.

BICYCLE.

SPECIFICATION forming part of Letters Patent No. 287,717, dated October 30, 1883.

Application filed September 1, 1883. (No model.)

*To all whom it may concern:*

Be it known that I, SAMUEL A. POTTER, of Cincinnati, Hamilton county, Ohio, have invented a new and useful Improvement in Bicycles, of which the following is a specification.

My invention relates to those bicycles which are provided with a means for increasing, at will of the wheelman, the distance between the seat and the rear wheel, in order to maintain the proper position of the wheelman vertically over the drive-wheel axle in ascending steep grades. With this object in view the fork to which the rear wheel is journaled, instead of constituting an integral projection from the frame or "backbone," is made capable of being shifted longitudinally of said backbone, in the manner hereinafter explained.

In the accompanying drawings, Figure 1 is a partially-sectioned elevation of a bicycle embodying my invention, the machine being represented in its normal condition. Fig. 2 is a section to a larger scale of the extensible perch. Fig. 3 is a section at the line $x\ x$.
In my improvement the beam-perch or backbone A consists, as usual, of a curved and tapering tube; but the fork B, which carries the journals C of the rear wheel, D, instead of being a permanent projection from the backbone, has a sliding connection therewith, as follows: The backbone A is pierced at its lower extremity by a square or other non-circular orifice, to receive a correspondingly-formed steel rod, E, which constitutes a long shank to the rear-wheel fork.

From the upper extremity of the shank E project two cheeks, F, that extend through a slot, $a$, in the rear side of the backbone. Secured by pivot G to the said cheeks F is an ear or projection, $h$, from one end of a lever, H, a pivot, I, near the mid-length of which serves to articulate said lever to a pair of links, J, which are themselves articulated, by pivot K, to lugs L, which project from the backbone.

The parts being in their normal positions, as shown by strong lines in Fig. 1, and it being desired to adapt the machine for ascent of an upgrade, the rider throws the lever H, together with the attached rear wheel, D, into the positions shown by dotted line in said figure. The parts are so disposed that the articulation I, when it reaches the last-named position, is located slightly forward of a straight line joining the articulations G and K, thus making the device self-locking. The device is also manifestly self-locking in the normal position, by reason of the weight of the superincumbent parts.

It is evident that the part E may be considered and spoken of as an "extensible member" of the perch or backbone A.

While preferring to use for the purpose specified a lever such as the lever H, I may nevertheless employ for the operating mechanism any other suitable mechanical expedient, such as a rack and pinion, a screw, or a worm motion.

I claim as new and of my invention—

In a bicycle, the combination of a protractible rear wheel, D, having a long non-circular shank, E, formed with cheeks F at its upper end, the tubular backbone A, having a non-circular orifice at its lower end to receive the shank, and a slot, $a$, for the cheeks to project through, links J, hinged to the backbone, and a lever, H, hinged to the cheeks and links, as set forth.

In testimony of which invention I hereunto set my hand.

SAMUEL A. POTTER.

Attest:
GEO. H. KNIGHT,
A. T. HART.